US009261600B2

(12) United States Patent
Abraham (10) Patent No.: US 9,261,600 B2
(45) Date of Patent: *Feb. 16, 2016

(54) METHOD AND SYSTEM FOR CALIBRATING GROUP DELAY ERRORS IN A COMBINED GPS AND GLONASS RECEIVER (71) Applicant: Broadcom Corporation, Irvine, CA (US)

(72) Inventor: Charles Abraham, Los Gatos, CA (US)

(73) Assignee: Broadcom Corporation, Irvine, CA (US)

(*) Notice: Subject to any disclaimer, the term of this patent is extended or adjusted under 35 U.S.C. 154(b) by 192 days.

This patent is subject to a terminal disclaimer.

(21) Appl. No.: 13/758,470

(22) Filed: Feb. 4, 2013

(65) Prior Publication Data
US 2014/0062782 A1 Mar. 6, 2014

Related U.S. Application Data (63) Continuation of application No. 12/948,376, filed on Nov. 17, 2010, now Pat. No. 8,400,354, which is a continuation-in-part of application No. 12/192,963, filed on Aug. 15, 2008, now Pat. No. 7,859,454.

(51) Int. Cl.
G01S 19/33 (2010.01)
G01S 19/09 (2010.01)
G01S 19/23 (2010.01)

(52) U.S. Cl.
CPC ........ G01S 19/33 (2013.01); G01S 19/23 (2013.01)

(58) Field of Classification Search
CPC .......... G01S 19/09; G01S 19/33; G01S 19/37
USPC ............. 342/357.23, 357.46, 357.62, 357.73; 701/468, 470
See application file for complete search history.

(56) References Cited

U.S. PATENT DOCUMENTS 5,949,372 A 9/1999 Lennen
6,229,479 B1 5/2001 Kozlov et al.
(Continued)

FOREIGN PATENT DOCUMENTS

CN 1952683 A 4/2007
TW 200804767 A 1/2008
TW 200805997 A 1/2008

OTHER PUBLICATIONS

European Search Report for European Patent Application Serial No. 09010012.4-2220, dated Nov. 18, 2009.
English-language Abstract of Taiwanese Patent Publication No. 200805997 A, published Jan. 16, 2008, accessed from espacenet Database-Worldwide.
Office Action for Taiwanese Patent Application No. 098127367, mailed on Jun. 11, 2013.

Primary Examiner — Dao Phan
(74) Attorney, Agent, or Firm — Sterne, Kessler, Goldstein & Fox P.L.L.C.

(57) ABSTRACT

A combined GPS and GLONASS receiver receives GPS signals and GLONASS signals. A calibration signal is generated utilizing the received GPS signals and/or the received GLONASS signals to offset group delay errors in the received GLONASS signals. The generated calibration signal is filtered through Kalman filters to estimate group delay variations in the received GLONASS signals. The estimated group error delay variations are combined with the received GLONASS signals to calibrate the received GLONASS signals by offsetting the estimated group error delay variations. When GPS signals are not available for use, the combined GPS and GLONASS receiver obtains group delay errors stored or in the received GLONASS signals to estimate calibration coefficients. The estimate calibration coefficients are updated utilizing received GPS and/or GLONASS signals. The updated estimated calibration coefficients are stored before turning off the combined GPS and GLONASS receiver to expedite calibrating of GLONASS signals received upon turning on.

20 Claims, 7 Drawing Sheets

(56) References Cited

U.S. PATENT DOCUMENTS

| | | |
|---|---|---|
| 6,266,007 B1 | 7/2001 | Lennen |
| 6,363,123 B1 | 3/2002 | Balodis |
| 6,608,998 B1 | 8/2003 | Neumann et al. |
| 7,221,313 B2 | 5/2007 | Ganguly et al. |
| 7,859,454 B2 | 12/2010 | Abraham |
| 8,400,354 B2 * | 3/2013 | Abraham .................. 342/357.73 |
| 2007/0024497 A1 | 2/2007 | Shibata et al. |
| 2007/0233750 A1 | 10/2007 | Jhang et al. |
| 2007/0273580 A1 | 11/2007 | Tekawy et al. |
| 2011/0080322 A1 | 4/2011 | Abraham |

* cited by examiner

METHOD AND SYSTEM FOR CALIBRATING GROUP DELAY ERRORS IN A COMBINED GPS AND GLONASS RECEIVER

CROSS REFERENCE TO RELATED APPLICATIONS

This application is a continuation of U.S. application Ser. No. 12/948,376, filed on Nov. 17, 2010, which is a continuation in part of U.S. application Ser. No. 12/192,963 filed on Aug. 15, 2008, both of which are incorporated herein by reference in their entireties.

BACKGROUND OF THE INVENTION

1. Field of the Invention

Certain embodiments of the invention relate to signal processing for navigation satellite systems (NSS). More specifically, certain embodiments of the invention relate to a method and system for calibrating group delay errors in a combined GPS and GLONASS receiver.

2. Background Art

The Global Positioning System (GPS) and the Global Orbiting Navigation Satellite System (GLONASS) are two Global Navigation Satellite Systems (GNSS). GNSS receivers may normally determine their position by receiving satellite broadcast signals from a plurality of satellites.

A fully operational GPS comprises up to 24 earth orbiting satellites approximately uniformly dispersed around six circular orbits with four satellites each. Each satellite carries a cesium or rubidium atomic clock to provide timing information for the signals transmitted by the satellites. Each GPS satellite transmits L-band carrier signals continuously in two frequency bands centered at 1575.42 MHz and 1227.6 MHz, denoted as L1 and L2 respectively. The GPS L1 signal is quadri-phase modulated by two pseudo-random noise (PRN) codes in phase quadrature, designated as a coarse/acquisition code ("C/A code") and a precision ranging code ("P-code"). The GPS L2 signal is BPSK modulated by only the P-code. The C/A code is a gold code that is specific to each satellite, and has a symbol rate of 1.023 MHz. The unique content of each GPS satellite's C/A code is used to identify the source of a received signal. The P-code, is a relatively long, fine-grained code having an associated clock or chip rate of 10 f0=10.23 MHz. The full P-code has a length of 259 days, with each satellite transmitting a unique portion of the full P-code. The portion of the P-code used for a given GPS satellite has, a length of precisely one week (7,000 days) before this code portion repeats. The GPS satellite signals comprise navigational information of the transmitting GPS satellite which may be exploited by a corresponding satellite receiver to determine its own navigation information such as the satellite receiver's position and velocity.

The GLONASS system uses 24 satellites, distributed approximately uniformly in three orbital planes of eight satellites each. The GLONASS system transmits L-band carrier signals continuously in two frequency bands, denoted as L1 and L2, respectively, centered at frequencies of f1=(1.602+9 k/16) GHz and f2=(1.246+7 k/16) GHz, where k (=1, 2, . . . 24) is the channel or satellite Lumber. Each GLONASS satellite transmits signals in frequencies that are specific to each satellite. The GLONASS L1 signal is modulated by a C/A-code with a chip rate=0.511 MHz and by a P-code with a chip rate=5.11 MHz). The GLONASS L2 signal is BPSK modulated by only the P-code. The P-code is the same, and the C/A-code is the same, for each GLONASS satellite. The GLONASS satellite signals comprise navigation information of the transmitting GLONASS satellite which may be exploited by a corresponding satellite receiver to determine its own navigation information such as the satellite receiver's position and velocity.

Both the GPS system and the GLONASS system use transmission of coded radio signals, with the structure described above, from a plurality of Earth-orbiting satellites. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for calibrating group delay errors in a combined GPS and GLONASS receiver, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for calibrating group delay errors in a combined GPS and GLONASS receiver. Various aspects of the invention may provide calibrating received GLONASS signals based on a GPS based navigation for a combined GPS and GLONASS receiver. The combined GPS and GLONASS receiver may receive a plurality of GPS signals and a plurality of GLONASS signals. A calibration signal may be generated utilizing the received GPS signals and/or the received GLONASS signals. The generated calibration signal may be utilized to offset group delay errors in one or more of the plurality of received GLONASS signals. The generated calibration signal may be processed or filtered through one or more Kalman filters before the calibration of the received GLONASS signals occurs. The filtered calibration signal may be utilized to offset the group delay errors in the received GLONASS signals. The filtered calibration signal is reflective of the group delay variations associated with the received GLONASS signals. The group delay variations may be estimated via the Kalman filtering. The estimated group delay variations may be combined with the received GLONASS signals to calibrate the received GLONASS signals by offsetting the estimated group delay variations in the received GLONASS signals. The resulting calibrated received GLONASS signals may be utilized to generate GLONASS related navigation information. In instances where the estimated group delay variations are stable, the received GLONASS signals may also be directly applied or utilized by the combined GPS and GLONASS receiver to generate GLONASS related navigation information.

In some circumstances, the combined GPS and GLONASS receiver may receive the GLONASS signals before the presence of the GPS signals. In this regard, the combined GPS and GLONASS receiver may start the estimation of the group delay variations in the received GLONASS signals before the GPS signals become available for use. For example, the combined GPS and GLONASS receiver may obtain or collect group delay errors from the received GLONASS signals to estimate the group delay variations in the received GLONASS signals. The combined GPS and GLONASS receiver may also obtain or utilize group delay errors previously stored inside the combined GPS and GLONASS receiver to estimate the group delay variations in the received GLONASS signals. The estimated group delay variations may be utilized as calibration coefficients to generate the calibration signal. The combined GPS and GLONASS receiver may utilize the generated calibration signal to offset the group delay errors in the received GLONASS signals. Once the GPS signals are received or become available for use, the estimated group delay variations may be updated utilizing the received GPS signals. The updated group delay variations may then be utilized to generate an updated calibration signal to offset the group delay errors in the received GLONASS signals. The updated group delay variations may be stored before turning off the combined GPS and GLONASS receiver, and may be utilized to generate a newly updated calibration signal for the calibration of GLONASS signals received upon turning on the combined GPS and GLONASS receiver.

Figure 1:
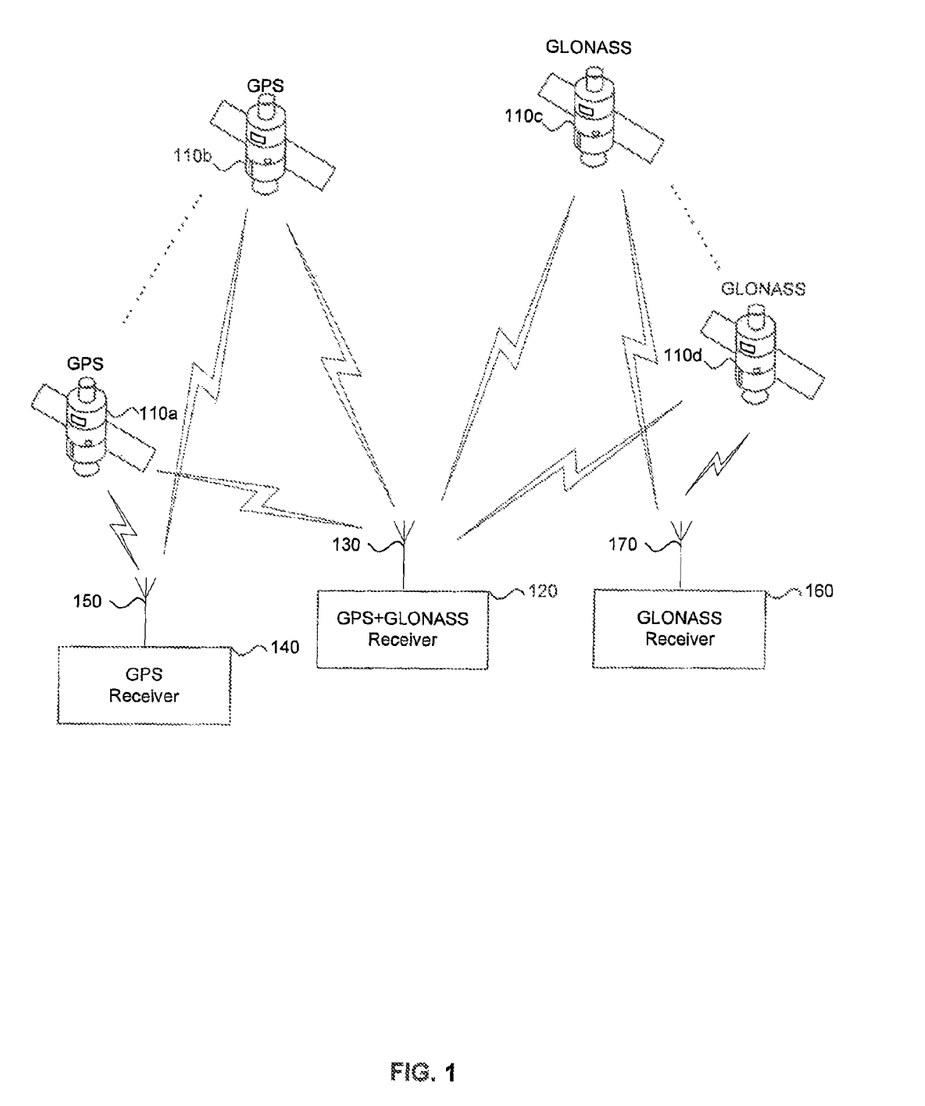
FIG. 1 is a diagram illustrating an exemplary satellite navigation system, in accordance with an embodiment of the invention.

FIG. 1 is a diagram illustrating an exemplary satellite navigation system, in accordance with an embodiment of the invention. Referring to FIG. 1, there is shown a satellite navigation system 100, comprising a combined GPS and GLONASS receiver 120, a GPS receiver 140, a GLONASS receiver 160, and a plurality of satellites, of which satellites 110a, 110b, 110c, and 110d may be illustrated. The combined GPS and GLONASS receiver 120, the GPS receiver 140, and the GLONASS receiver 160 may be communicatively coupled to a receiver antenna 130, a receiver antenna 150, and a receiver antenna 170, respectively.

The satellites 110a through 110d may comprise suitable logic, circuitry and/or code that may be enabled to generate and broadcast suitable radio-frequency (RF) signals that may be received by a satellite receiver, for example, the combined GPS and GLONASS receiver 120, and the GPS receiver 140, and the GLONASS receiver 160. The generated broadcast RF signals may be utilized to determine navigation information such as, for example, the position, the velocity, and the clock information of the combined GPS and GLONASS receiver 120, the GPS receiver 140 and/or the GLONASS receiver 160.

The combined GPS and GLONASS receiver 120 may comprise suitable logic, circuitry and/or code that may be enabled to receive signals broadcasted from both GPS and/or GLONASS satellites, for example, the satellites 110a through 110d. The combined GPS and GLONASS receiver 120 may be enabled to process the received satellite signals to identify the satellite source for each satellite signal, determine the time at which each identified satellite signal arrives at the antenna 130, and determine the present location of the satellite source such as the satellites 110a, 110b, 110c, or 110d. The combined GPS and GLONASS receiver 120 may be capable of tracking a plurality of both the GPS satellites and the GLONASS satellites and take measurements of code and carrier phase from each satellite. The received signals, whether GPS or GLONASS, may be processed by the combined GPS and GLONASS receiver 120 to provide navigation information. The navigation information may be calculated based on the received GPS signals, and/or the received GLONASS signals. Errors such as the group delay error in the received GLONASS signals may be removed or offset based on the GPS based navigation information while maintaining the combined GPS and GLONASS receiver 120 with the specific desirable characteristics such as anti-jamming capabilities. The combined GPS and GLONASS receiver 120 may operate with an initial assumption that the group delay errors for each GLONASS frequency band maybe unknown and as a result, may rely solely on the received GPS signals. Once a fix has been obtained on a transmitting GPS satellite, computed GPS navigation information may be used to determine the expected GLONASS signals.

In some circumstances, the combined GPS and GLONASS receiver 120 may receive GLONASS signals before GPS signals are present or received. The combined GPS and GLONASS receiver 120 may learn or obtain group delay errors in the received GLONASS signals so as to estimate group delay variations associated with the received GLONASS signals. The estimated group delay variations may be utilized to offset or remove the group delay errors in the received GLONASS signals.

In some instances, group delay variations and/or group delay errors in GLONASS system may be previously stored inside the combined GPS and GLONASS receiver 120. In this regard, before GPS signals become available for use, the combined GPS and GLONASS receiver 120 may utilize the stored group delay variations to offset the group delay errors in the received GLONASS signals. The combined GPS and GLONASS receiver 120 may also estimate group delay variations utilizing the stored group delay errors to offset the group delay errors in the received GLONASS signals. Once GPS signals are present or become available for use, the combined GPS and GLONASS receiver 120 may incorporate the GPS signals to calibrate the received GLONASS signals by offsetting the associated group delay errors. For example, the combined GPS and GLONASS receiver 120 may derive or compute GPS navigation information from the GPS signals. The computed GPS navigation information may be converted or transformed into corresponding GLONASS navigation information, which may be utilized by the combined GPS and GLONASS receiver 120 to estimate group delay variations and/or group delay errors in the received GLONASS signals. The resulting estimated group delay variations and/or group delay errors may then be utilized to offset the group delay errors in the received GLONASS signals.

In some circumstances, the combined GPS and GLONASS receiver 120 may need to be turned off or shut down. The combined GPS and GLONASS receiver 120 may store the latest group delay variations and/or group delay errors before turning off. The combined GPS and GLONASS receiver 120, upon turning on, may utilize the stored group delay variations and/or group delay errors to immediately start the calibration of GLONASS signals received. The stored group delay variations and/or group delay errors may be updated or refined dynamically utilizing GPS signals and/or GLONASS signals received after the combined GPS and GLONASS receiver 120 is turned on. The combined GPS and GLONASS receiver 120 may incorporate or utilize the updated group delay variations and/or group delay errors to continue the calibration of the received GLONASS signals.

The antenna 130 may comprise suitable logic, circuitry and/or code that may be enabled to receive L band signals from a plurality of GPS satellites and a plurality of GLONASS satellites and pass to the combined GPS and GLONASS receiver 120 to be processed for corresponding navigation information. Although a single antenna 130 is illustrated, the invention may not be so limited. Accordingly, one or more antennas may be utilized by the combined GPS and GLONASS receiver 120 without departing from the spirit and scope of various embodiments of the invention.

The GPS receiver 140 may comprise suitable logic, circuitry and/or code that may be operable to receive signals broadcasted from GPS satellites, for example, the satellites 110a. The GPS receiver 140 may be enabled to process the received satellite signals to identify the satellite source for each satellite signal, and determine the time at which each identified satellite signal arrives at the antenna 150. The GPS receiver 140 may also be operable to determine a present location of the satellite source such as the satellites 110a and 110b. The GPS receiver 140 may be capable of tracking a plurality of the GPS satellites and may take measurements of code and/or carrier phase from each GPS satellite. The received GPS signals may be processed by the GPS receiver 140 to provide navigation information. The navigation information may be calculated based on the received GPS signals.

The antenna 150 may comprise suitable logic, circuitry and/or code that may be enabled to receive L band signals from a plurality of GPS satellites and communicate them to the GPS receiver 140 where they may be processed to generate corresponding navigation information.

The GLONASS receiver 160 may comprise suitable logic, circuitry and/or code that may be operable to receive signals broadcasted from GLONASS satellites, for example, the satellites 110c. The GLONASS receiver 160 may be enabled to process the received, satellite signals to identify the satellite source for each satellite signal, determine the time at which each identified satellite signal arrives at the antenna 170, and determine the present location of the satellite source such as the satellites 110c and 110d. The GLONASS receiver 160 may be capable of tracking a plurality of the GLONASS satellites and may take measurements of code and/or carrier phase from each GLONASS satellite. The received GLONASS signals may be processed by the GLONASS receiver 160 to provide navigation information. The navigation information may be determined based on the received GLONASS signals.

The antenna 170 may comprise suitable logic, circuitry and/or code that may be enabled to receive L band signals from a plurality of GLONASS satellites and communicate them to the GLONASS receiver 160 where they may be processed to generate corresponding navigation information.

In operation, the combined GPS and GLONASS receiver 120 may receive a plurality of satellite signals from GPS satellites such as 110a and 110b, and GLONASS satellites such as 110c and 110d. The combined GPS and GLONASS receiver 120 may be enabled to identify the satellite source for each satellite signal. For example, each GLONASS satellite may be identified by its satellite vehicle identification number ($SV_{ID}$) acquired from the GLONASS almanac data which may be related to the carrier transmission frequency of a particular GLONASS satellite. Each GPS satellite may be identified by matching or correlating a unique portion of the GPS P-code for that particular satellite. Once a synchronization or lock has been successfully established on the transmitting GPS satellites and GLONASS satellites, the combined GPS and GLONASS receiver 120 may take code and carrier phase measurements on each identified satellite signals, GPS and/or GLONASS, received via the antenna 130.

The combined GPS and GLONASS receiver 120 may be operable to process the received GPS signals and generate GPS navigation information for the combined GPS and GLONASS receiver 120. Respective GLONASS signals may be estimated based on the GPS navigation information and a calibration signal. The calibration signal may be reflective of group delay variations associated with the received GLONASS signals. The calibration signal may be derived or generated based on a comparison of the estimated GLONASS signal and actual received GLONASS signals. The calibration signal may be used to calibrate the received GLONASS signals by offsetting or removing associated group delay errors. GLONASS based navigation information may be calculated based on the calibrated GLONASS signals. The combined GPS and GLONASS receiver 120 may operable to generate the GPS based navigation information, the GLONASS based navigation information, and/or a combined version of the GPS navigation information and the GLONASS navigation information.

In instances where the combined GPS and GLONASS receiver 120 receives GLONASS signals before GPS signals are present, the combined GPS and GLONASS receiver 120 may start the calibration of the received GLONASS signals. For example, in instances where group delay variations and/or group delay errors for GLONASS channels may be previously stored into the combined GPS and GLONASS receiver 120 by manufacturer and/or receiver designers, the combined GPS and GLONASS receiver 120 may utilize the stored group delay variations and/or group delay errors to generate a calibration signal. The generated calibration signal may be utilized to offset or remove the group delay errors in the received GLONASS signals.

In another exemplary embodiment of the invention, the combined GPS and GLONASS receiver 120 may be operable to process or filter the received GLONASS signals to generate or determine GLONASS navigation information for the combined GPS and GLONASS receiver 120. The combined GPS and GLONASS receiver 120 may learn or obtain or otherwise determine the group delay errors in the received GLONASS signals via the generated GLONASS navigation information. Group delay variations may be determined and may be utilized as calibration coefficients to form or generate a calibration signal. The combined GPS and GLONASS receiver 120 may utilize the generated calibration signal to offset or remove the group delay errors in the received GLONASS signals. Once GPS signals are present or become available for use, the combined GPS and GLONASS receiver 120 may determine or calculate GPS navigation information from the received GPS signals for the combined GPS and GLONASS receiver 120. The determined GPS navigation information may be converted or transformed to corresponding GLONASS navigation information to update or refine the calibration coefficients of the calibration signal. The combined GPS and GLONASS receiver 120 may utilize the resulting updated calibration signal to continue the calibration of the received GLONASS signals.

In instances where the combined GPS and GLONASS receiver 120 needs to be turned off or shut down, the combined GPS and GLONASS receiver 120 may be configured to store the latest calibration coefficients of the calibration signal and/or the latest group delay errors before turning off. The combined GPS and GLONASS receiver 120 may utilize the stored calibration coefficients or group delay errors to form or generate a calibration signal upon turning on. In this regard, the combined GPS and GLONASS receiver 120 may utilize the stored calibration coefficients or group delay errors to start the calibration of received GLONASS signals immediately upon turning on. The combined GPS and GLONASS receiver 120 may incorporate subsequently received GPS signals and/or GLONASS signals to update or refine the calibration coefficients to continue the calibration of the subsequently received GLONASS signals.

Many applications such as car navigation, aircraft navigation, and scientific applications may benefit from use of both systems in the same satellite receiver. A combined GPS and GLONASS receiver may provide a high degree of system-wide integrity. For example, if either the GPS or the GLONASS suffers a system-wide failure then the combined GPS and GLONASS satellite receiver will continue to operate with the remaining GPS or GLONASS operational systems. When both the GPS system and the GLONASS systems are operational, measurements from each of them may be continually compared in order to detect the system-wide failures. The system-wide failure includes not only the satellite failing in some manner, but also includes operating in environments Where heavy radio frequency interferences may be present. The radio interferences affecting one system need not affect the other system because GPS and GLONASS operate in different frequency bands. Code phase (also known as pseudo-range) measurements are commonly processed in combined GPS and GLONASS receivers to provide high accuracy position, velocity and time measurements. Depending on implementation, it may be desirable for a combined GPS and GLONASS receiver to include specific filter and amplifier components to prevent, for example, possible jamming. The specific characteristics of filters, amplifiers and other active components in the combined GPS and GLONASS receiver design may cause group delay distortion, which is the variations in group delay across the received bandwidth, and may result in error in code phase measurements.

Figure 2:
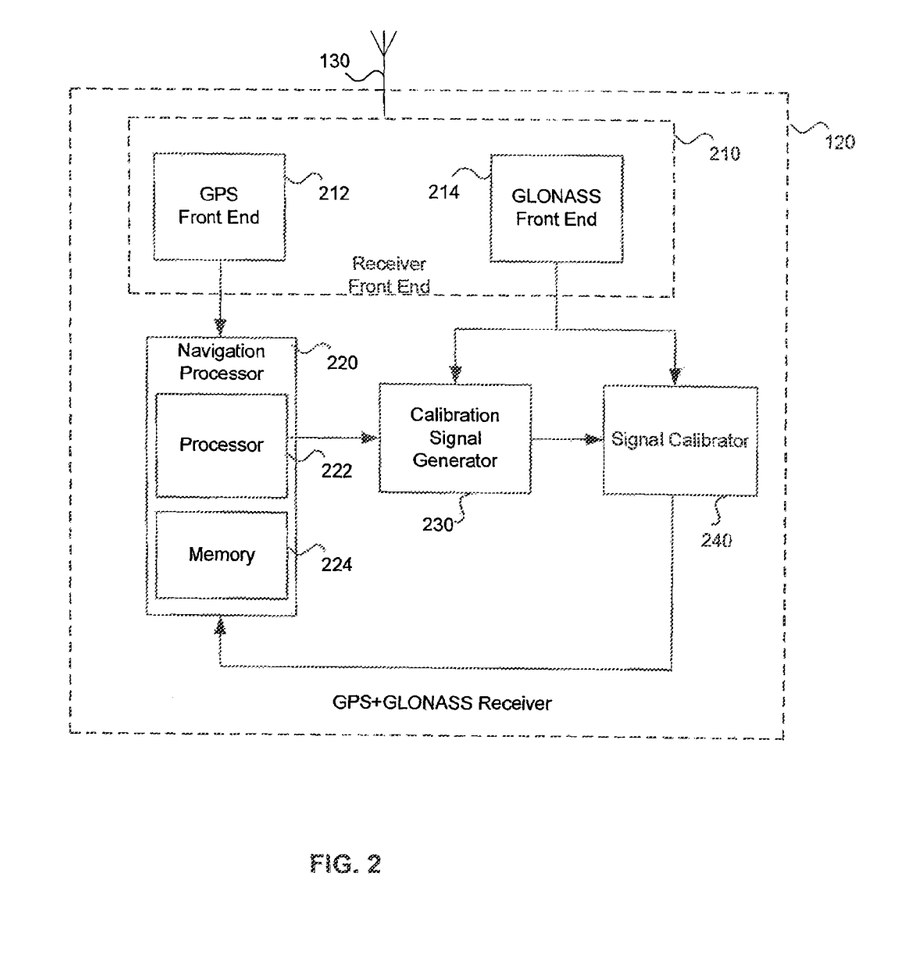
FIG. 2 is a diagram illustrating an exemplary combined GPS and GLONASS receiver, in accordance with an embodiment of the invention.

FIG. 2 is a diagram illustrating an exemplary combined GPS and GLONASS receiver, in accordance with an embodiment of the invention. Referring to FIG. 2, there is shown a combined GPS and GLONASS receiver 120, comprising a receiver front end 210, a navigation processor 220, a calibration signal generator 230, and a signal calibrator 240. The receiver front end 210 may comprise a GPS front end 212 and a GLONASS front end 214. The navigation processor 220 may comprise a processor 222 and a memory 224. The combined GPS and GLONASS receiver 120 may be communicatively coupled to the receiver antenna 130. Although a single antenna is illustrated, the invention may not be so limited. Accordingly, one or more antennas may be utilized by the combined GPS and GLONASS receiver 120 without departing from the spirit and scope of various embodiments of the invention.

The receiver front end 210 may comprise suitable logic, circuitry and/or code that may be enabled to receive satellite broadcast signals via the receiver antenna 130 and process them so as to generate baseband signals, which may be suitable for further processing in the combined GPS and GLONASS receiver 120.

The GPS front end 212 may comprise suitable logic, circuitry and/or code that may be enabled to receive GPS satellite broadcast signals via the receiver antenna 130 and convert them to GPS baseband signals, which may be suitable for further processing in the combined GPS and GLONASS receiver 120 for navigation information, whether GPS based or combined GPS and GLONASS based.

The GLONASS front end 214 may comprise suitable logic, circuitry and/or code that may be enabled to receive GLONASS satellite broadcast signals via the receiver antenna 130 and convert them to GLONASS baseband signals, which may be suitable for further processing in the combined GPS and GLONASS receiver 120 for navigation information, whether GLONASS based or combined GPS and GLONASS based.

The navigation processor 220 may comprise suitable logic, circuitry and/or code that may be enabled to process received satellite signals via the receiver front end 210 and extract information for each received satellite signal to provide navigation information for the combined GPS and GLONASS receiver 120.

The processor 222 may comprise suitable logic, circuitry and/or code that may be operable to determine navigation information from the received satellite signals that are processed by the corresponding GLONASS front end 210 and GPS front end 212. The navigation information may be a GPS based or a GLONASS based. The processor 222 may use various algorithms to combine the GPS based information and the GLONASS based navigation information into combined navigation information. The combined navigation information may be generated by removing errors such as the group delay error from the received GLONASS signals based on the GPS based navigation information. In this regard, the processor 222 may be operable to start the calibration of the received GLONASS signals before GPS signals become available for use. In other words, the processor 222 may also be operable to remove or offset the group delay error in the received GLONASS signals without utilizing the GPS based navigation information.

In an exemplary embodiment of the invention, in instances when GPS signals are not available for use, the processor 222 may be operable to obtain group delay errors from the received GLONASS signals to estimate or determine group delay variations for GLONASS channels. The processor 222 may also be operable to obtain group delay errors that are stored in a look-up table, for example, inside the memory 224 to estimate or determine group delay variations for GLONASS channels. The processor 222 may utilize the determined group delay variations as calibration coefficients to form or generate a calibration signal. In this regard, the generated calibration signal is reflective of the determined group delay variations. The processor 222 may utilize the generated calibration signal to remove or offset the group delay errors in the received GLONASS signals. Once GPS signals are present or become available for use, the processor 222 may incorporate the GPS signals to calibrate the received GLONASS signals by offsetting the associated group delay errors. The processor 222 may be operable to store the latest group delay variations or calibration coefficients before the combined GPS and GLONASS receiver 120 is turned off. The processor 222 may utilize the stored calibration coefficients to form or generate a calibration signal to start the calibration of GLONASS signals received upon turning on the combined GPS and GLONASS receiver 120.

The memory 224 may comprise suitable logic, circuitry, and/or code that enable storing information such as executable instructions and data that may be utilized by the processor 222. The executable instructions may comprise algorithms that may be enabled to calculate navigation information using the acquired satellite signals automatically or upon request/signaled. The data may comprise a calibration signal comprising various calibration coefficients that may be used for calibrating the received GLONASS signals. The memory 224 may comprise RAM, ROM, low latency nonvolatile memory such as flash memory and/or other suitable electronic data storage.

The calibration signal generator 230 may comprise suitable logic, circuitry, and/or code that may enable generation of a calibration signal, comprising plurality of calibration coefficients. The calibration signal generator 230 may convert GPS based navigation information into corresponding GLONASS navigation information. An expected GLONASS signal associated with the corresponding GLONASS navigation information may be estimated. The expected GLONASS signals may be compared to the actual received GLONASS signals at the calibration signal generator 230 to determine group delay errors for each received GLONASS signal. These group delay errors may be used as calibration coefficients of the generated calibration signal to be communicated to the signal calibrator 240 to calibrate the received GLONASS signals by dynamically removing or offsetting corresponding group delay errors in the received GLONASS signals.

In instances where GLONASS signals are received before GPS signals are present or become available for use, the calibration signal generator 230 may learn or obtain the group delay errors in the received GLONASS signals to estimate calibration coefficients of the calibration signal. In some instances, group delay errors may be previously stored inside the memory 224, the calibration signal generator 230 may be operable to obtain the stored group delay errors from the memory 224 to determine or estimate calibration coefficients of the calibration signal. The resulting calibration signal may be utilized to offset the group delay errors in the received GLONASS signals. Once GPS signals are present or become available for use, the calibration signal generator 230 may incorporate the GPS signals into the calibration of the received GLONASS signals.

In some instances, the combined GPS and GLONASS receiver 120 may need to be turned off. In this regard, the combined GPS and GLONASS receiver 120 may store the latest calibration coefficients into a look-up table, for example, inside the combined GPS and GLONASS receiver 120 before turning off. Once the combined GPS and GLONASS receiver 120, is turned on, the calibration signal generator 230 may utilize the stored calibration coefficients to generate a calibration signal to immediately start the calibration of GLONASS signals received. The stored calibration coefficients may be updated or refined utilizing the received GLONASS signals to continue the calibration process for the subsequently received GLONASS signals.

The signal calibrator 240 may comprise suitable logic, circuitry, and/or code that may be configured to remove associated group delay errors from the received GLONASS signals by combining the received GLONASS signals with a calibration signal from the calibration signal generator 230. The signal calibrator 240 may communicate the calibrated GLONASS signals with the navigation processor 220 to produce GLONASS based navigation information or combined GPS and GLONASS based navigation information.

In operation, a plurality of satellite signals from GPS satellites such as 110a and 110b, and GLONASS satellites such as 110c and 110d may be received at the antenna 130 of the combined GPS and GLONASS receiver 120. The combined GPS and GLONASS receiver 120 may be enabled to identify and determine the satellite source for each satellite signal. Depending on the type of received satellite signals, the received satellite signals may be measured at the antenna 130 and communicated to the GPS front end 212 or the GLONASS front end 214, respectively. The received GPS signals may be demodulated and converted to baseband signals via the GPS front end 212 and communicated to the navigation processor 220. The processor 222 in the navigation processor 220 may use various algorithms stored in the memory 224 to calculate GPS navigation information for the combined GPS and GLONASS receiver 120. The resulting GPS navigation information may be communicated to the calibration signal generator 230. The calibration signal generator 230 may be operable to estimate the GLONASS signals based on the GPS based navigation information. The estimated GLONASS signals may be compared to the actual GLONASS signals at the calibration signal generator 230. The resulting errors such as group delay errors for each of the GLONASS signals may be determined. These group delay errors may be used to generate a calibration signal, which may be communicated to the signal calibrator 240. In this regard, in instances where GLONASS signals are received before GPS signals are present for use, the calibration signal generator 230 may learn or obtain group delay variations from the group delay errors in the received GLONASS signals and/or from group delay errors previously stored in the memory 224. The calibration signal generator 230 may utilize the obtained group delay variations to immediately start the calibration of the received GLONASS signals without use of GPS signals. The signal calibrator 240 may be operable to calibrate, in real time, the received GLONASS signals by offsetting the group delay errors in GLONASS signals.

Figure 3:
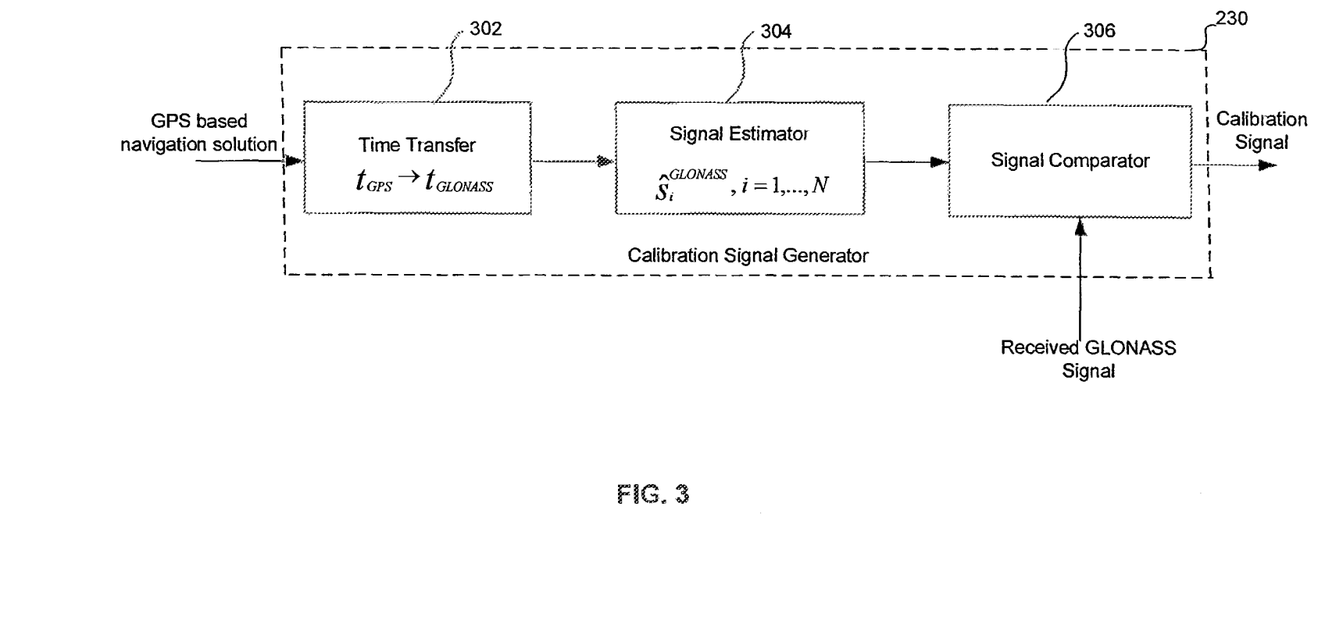
FIG. 3 is a diagram illustrating an exemplary calibration signal generator, in accordance with an embodiment of the invention.

FIG. 3 is a diagram illustrating an exemplary calibration signal generator, in accordance with an embodiment of the invention. Referring to FIG. 3, there is shown a calibration signal generator 230 comprising a time transfer 302, a signal estimator 304, and a signal comparator 306.

The time transfer 302 may comprise suitable logic, circuitry, and/or code that may enable taking a receiver clock offset determined by a GPS based navigation solution and adding GPS-GLONASS system time reference bias to it.

The signal estimator 304 may comprise suitable logic, circuitry, and/or code that may enable estimation of GLONASS signals corresponding to given navigation information. The clock information associated to the estimated GLONASS signals may be the transferred receiver clock offset from the time transfer 302.

The signal comparator 306 may comprise suitable logic, circuitry, and/or code that may enable comparing the estimated GLONASS signals with actual received GLONASS signals to generate, for example, group delay errors for each received GLONASS signal. The resulting group delay errors may be outputted as calibration coefficients to the signal calibrator 240.

In operation, GPS based navigation information for the combined GPS and GLONASS receiver 120 may be calculated by the navigation processor 220 based on the demodulated received GPS signals and pass to the calibration signal generator 230. The clock information associated with the GPS based navigation information may be extracted at the time transfer 302 and may be transferred to a corresponding GLONASS receiver clock offset from the GLONASS satellite system. The signal estimator 304 may estimate respective GLONASS signals corresponding to the GPS navigation information with the transferred GLONASS receiver clock offset. The signal comparator 306 may compare each of the received GLONASS signal with the respective estimated GLONASS signal. Based on the comparison, corresponding group delay errors may be generated by the signal comparator 306 for each received GLONASS signal. The corresponding generated group delay errors may be outputted as a calibration signal from the calibration signal generator 230 and utilized to calibrate the group delay errors for the received GLONASS signals.

Figure 4:
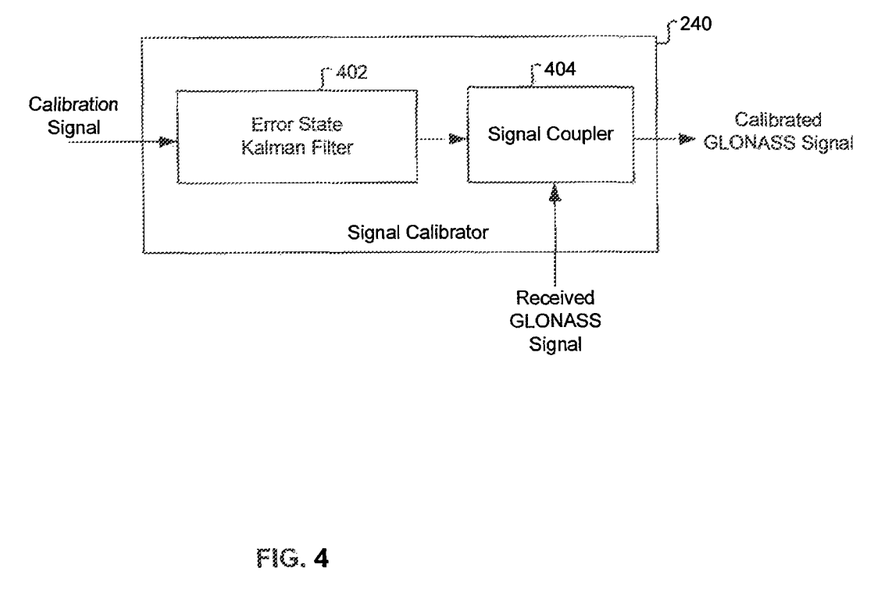
FIG. 4 is a diagram illustrating an exemplary error state Kalman filter used in a combined GPS and GLONASS receiver, in accordance with an embodiment of the invention.

FIG. 4 is a diagram illustrating an exemplary error state Kalman filter used in a combined GPS and GLONASS receiver, in accordance with an embodiment of the invention. Referring to FIG. 4, there is shown a signal calibrator 240, comprising an error state Kalman filter 402 and a signal coupler 404.

The signal calibrator 240 may comprise suitable logic, circuitry, and/or code that may be operable to improve or optimize the accuracy of received GLONASS signals by removing associated group delay errors.

The error state Kalman filter 402 may comprise suitable logic, circuitry, and/or code that may be configured to provide an optimized estimate of group delay variations in received GLONASS signals at the combined GPS and GLONASS receiver 120 in real time. The error state Kalman filter 402 may indicate how quickly the group delay variations in the received GLONASS signals may stabilize. The error state Kalman filter 402 may produce an adaptive adjustment to be used for offsetting the group delay variations in the received GLONASS signals. Error states associated with the error state Kalman filter 402 may be defined and may comprise group delay errors from each received GLONASS signal at the combined GPS and GLONASS receiver 120. Initially the group delay errors may be substantially unknown and may be estimated to be zero, for example. This may indicate that the error state Kalman filter 402 may make little use of GLONASS measurements for navigation. As the filtering process may continue, the group delay errors may become known, the error state Kalman filter 402 may make substantially use of the GLONASS measurements for navigation. In other words, as the filtering process may continue, the estimated group delay variations associated with the received GLONASS signals may become stable, that is, bounded within an acceptable range. In this regard, the error state Kalman filter 402 may make substantially use of the GLONASS measurements to produce or generate navigation information for the combined GPS and GLONASS receiver 120.

The error state Kalman filter 402 may ensure gradual changes in the group delay errors. The error state Kalman filter 402 may continuously update the calibration coefficients while simultaneously making use of then.

The signal coupler 404 may comprise suitable logic, circuitry, and/or code that may be operable to combine the actual received GLONASS signal with estimated group delay variations from the error state Kalman filter 402 in order to produce respective calibrated GLONASS signals. The group delay errors in the received GLONASS signals may be offset and/or removed by the signal coupler 404. The signal coupler 404 may be operable to communicate the calibrated GLONASS signals to the navigation processor 220 in the combined GPS and GLONASS receiver 120. The processor 222 may utilize the calibrated GLONASS signals to generate GLONASS related navigation information.

The error state Kalman filter 402 may be implemented in various ways without departing from the scope of the various embodiments of the invention. For example, the calibration information from the error state Kalman filter 402 may be applied outside the error state Kalman filter 402 as described with respect to FIG. 4. The calibration information may also be fed back to the error state Kalman filter 402 for computing a solution.

Although a single error state Kalman filter 402 is illustrated, the invention may not be so limited. Accordingly, one or more error state Kalman filters may be utilized by the combined GPS and GLONASS receiver 120 without departing from the spirit and scope of various embodiments of the invention.

Figure 5:
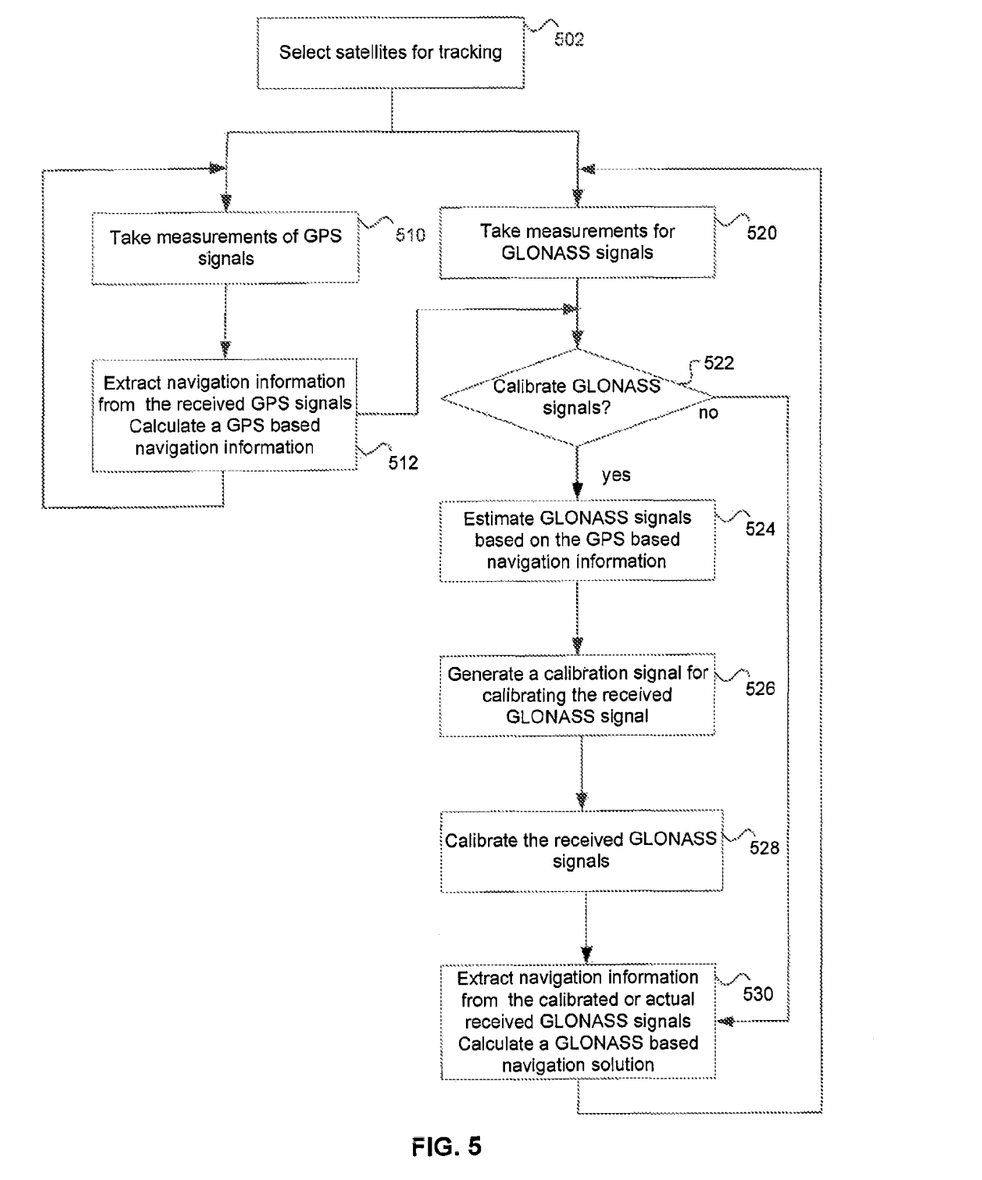
FIG. 5 is a flow chart illustrating exemplary steps for calibrating group delay errors in a combined GPS and GLONASS receiver, in accordance with an embodiment of the invention.

FIG. 5 is a flow chart illustrating exemplary steps for calibrating group delay errors in a combined GPS and GLONASS receiver in accordance with an embodiment of the invention. Referring to FIG. 5, the exemplary steps may begin with step 502, where the combined GPS and GLONASS receiver 120 may select satellites for tracking. In step 510, the combined GPS and GLONASS receiver 120 may start taking measurements for the received GPS signals from the corresponding GPS satellites. In step 512, the combined GPS and GLONASS receiver 120 may extract navigation information from the received GPS signals. The extracted navigation information may be communicated to the navigation processor 220 to produce a GPS based navigation information for the combined GPS and GLONASS receiver 120, the process may proceed in step 510 and/or step 522.

In step 520, the combined GPS and GLONASS receiver 120 may start taking measurements for the received GLONASS signals from the corresponding GLONASS satellites. In step 522, it may be determined whether the received GLONASS signals should be calibrated. In instances where the received GLONASS signals may need to be calibrated for offsetting variations in associated group delay errors, then in step 524, the GLONASS signals may be estimated based on the GPS based navigation information calculated in step 512. In step 526, a calibration signal comprising calibration coefficients for calibrating the received GLONASS signals may be generated. In step 528, the received GLONASS signals may be calculated based on the generated calibration signal. In step 530, navigation information from the calibrated GLONASS signals may be extracted and GLONASS based navigation information may be determined based on the calibrated GLONASS signals. The exemplary steps may then return to step 520. In step 522, in instances where the received GLONASS signals may not need to be calibrated, then in step 530, GLONASS navigation information may be determined based on the actual received GLONASS signals. The exemplary steps may then return to step 520.

Figure 6:
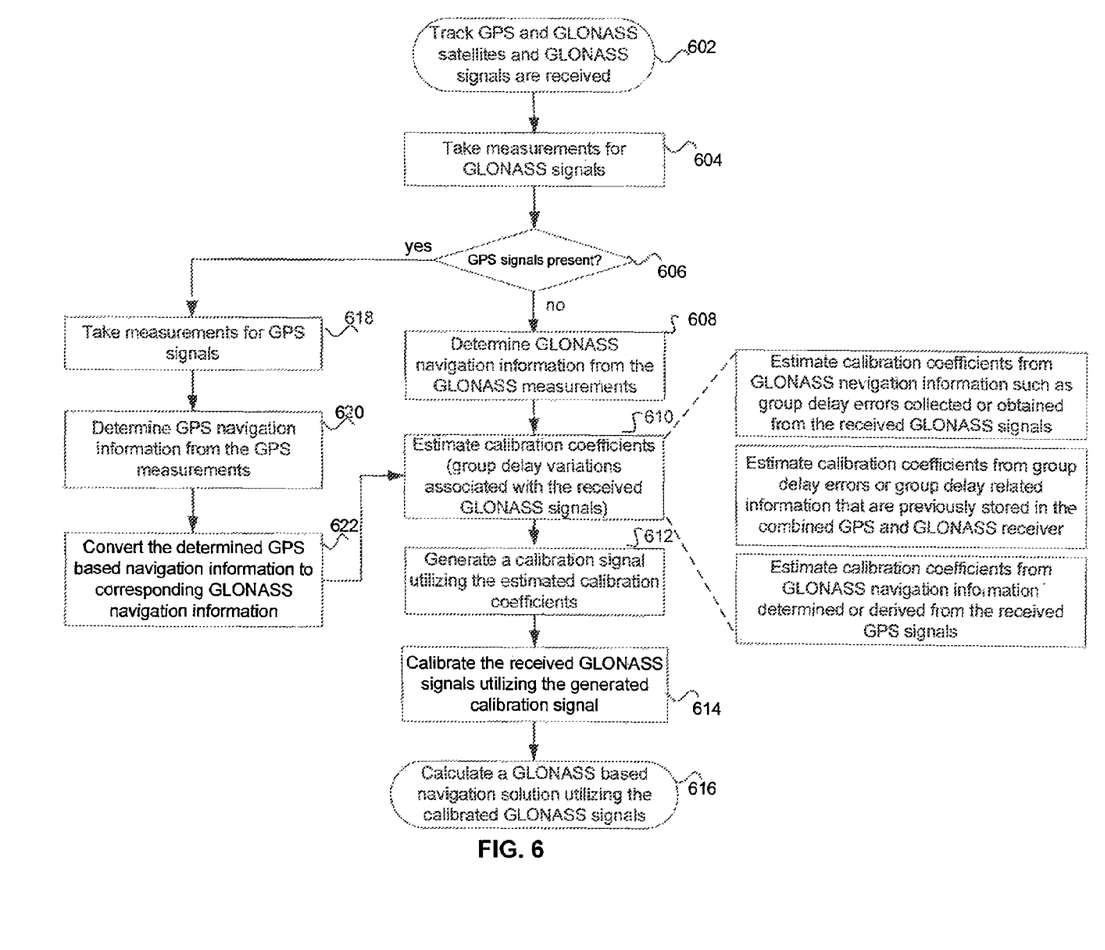
FIG. 6 is a flow chart illustrating exemplary steps for off-setting group delay errors in a combined GPS and GLONASS receiver, in accordance with an embodiment of the invention.

FIG. 6 is a flow chart illustrating exemplary steps for offsetting group delay errors in a combined GPS and GLONASS receiver, in accordance with an embodiment of the invention. Referring to FIG. 6, the exemplary steps may begin with step 602, where the combined GPS and GLONASS receiver 120 may track or select GPS and GLONASS satellites. GLONASS signals are present and received from corresponding GLONASS satellites. In step 604, the combined GPS and GLONASS receiver 120 may start taking measurements for the received GLONASS signals. In step 606, it may be determined whether GPS signals are present for use by the combined GPS and GLONASS receiver 120. In instances where GPS signals are not present or available for use by the combined GPS and GLONASS receiver 120, then in step 608, in which the combined GPS and GLONASS receiver 120 may determine or extract GLONASS navigation information from the GLONASS measurements. In step 610, the combined GPS and GLONASS receiver 120 may determine or estimate calibration coefficients (group delay variations) from the GLONASS navigation information. In instances where group delay errors in terms of GLONASS channels are previously stored into the combined GPS and GLONASS receiver 120 by manufacturer or receiver designers, the combined GPS and GLONASS receiver 120 may determine or estimate calibration coefficients (group delay variations) utilizing the stored group delay errors. Once GPS signals are present or become available for use, the combined GPS and GLONASS receiver 120 may incorporate corresponding GPS based navigation information to determine or estimate calibration coefficients (group delay variations). In step 612, the calibration signal generator 230 may utilize the estimated calibration coefficients to form or generate a calibration signal. In step 614, the signal calibrator 240 may utilize the generated calibration signal to offset the group delay errors in the received GLONASS signals for the calibration of the received GLONASS signals. In step 616, the navigation processor 220 may calculate or determine a GLONASS based navigation solution utilizing the calibrated GLONASS signals.

In step 606, in instances where GPS signals are present or available for use by the combined GPS and GLONASS receiver 120, then in step 618, in which the combined GPS and GLONASS receiver 120 may start taking measurements for the received GPS signals. In step 620, the combined GPS and GLONASS receiver 120 may determine or extract GPS navigation information from the GPS measurements. In step 622, the combined GPS and GLONASS receiver 120 may convert the determined GPS based navigation information to corresponding GLONASS navigation information. The exemplary steps may proceed in step 610.

Figure 7:
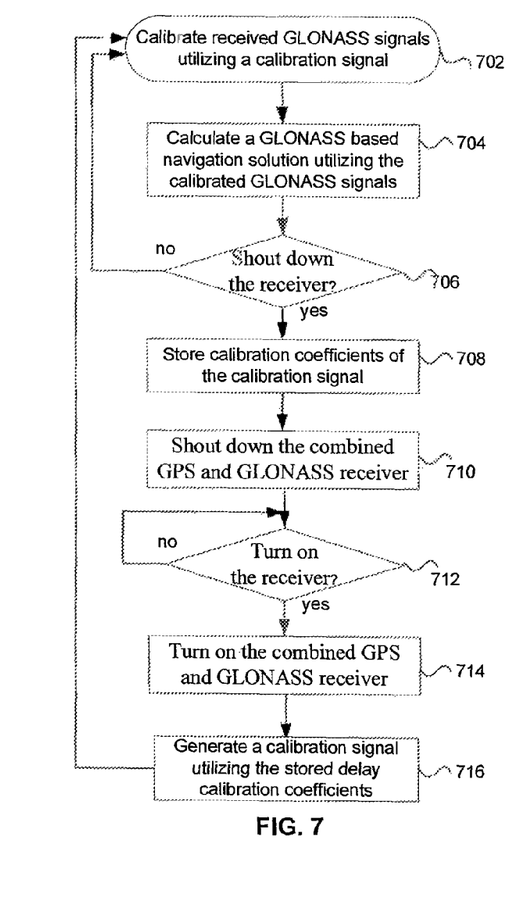
FIG. 7 is a flow chart illustrating exemplary steps for immediately offsetting group delay errors in a combined GPS and GLONASS receiver upon turning on, in accordance with an embodiment of the invention.

FIG. 7 is a flow chart illustrating exemplary steps for immediately offsetting group delay errors in a combined GPS and GLONASS receiver upon turning on, in accordance with an embodiment of the invention. Referring to FIG. 7, the exemplary steps may begin with step 702, where the combined GPS and GLONASS receiver 120 may calibrate received GLONASS signals utilizing a calibration signal. In step 704, the navigation processor 220 may calculate or determine a GLONASS based navigation solution utilizing the calibrated GLONASS signals. In step 706, it may be determined whether the combined GPS and GLONASS receiver 120 needs to be shout down or turned off. In instances where the combined GPS and GLONASS receiver 120 needs to be shut down, then in step 708, in which the combined GPS and GLONASS receiver 120 may store the latest calibration coefficients of the calibration signal into the memory 224. In step 710, the combined GPS and GLONASS receiver 120 may be shut down after the storage of the latest calibration coefficients. In step 712, it may be determined whether the combined GPS and GLONASS receiver 120 needs to be turned on. In instances where the combined GPS and GLONASS receiver 120 needs to be turned on, then in step 714, in which the combined GPS and GLONASS receiver 120 is turned on. In step 716, the calibration signal generator 230 may be operable to generate a calibration signal utilizing the stored calibration coefficients. The exemplary steps may return to step 702.

In step 706, in instances where the combined GPS and GLONASS receiver 120 does not need to be shut down, then the exemplary steps may return to step 702. In step 712, in instances where the combined GPS and GLONASS receiver 120 does not need to be turned on, then the exemplary steps may stay in step 712.

Aspects of a method and system for calibrating group delay errors in a combined GPS and GLONASS receiver are provided. In accordance with various embodiments of the invention, the combined GPS and GLONASS receiver 120 may be operable to receive a plurality of GPS signals and a plurality of GLONASS signals. A calibration signal may be generated utilizing the received GPS signals and/or the received GLONASS signals. The combined GPS and GLONASS receiver 120 may utilize the generated calibration signal to offset group delay errors in one or more of the plurality of received GLONASS signals. The generated calibration signal may be processed or filtered through one or more Kalman filters such as the error state Kalman filter 402 before calibrating the received GLONASS signals. The filtered calibration signal that is reflective of or corresponds to the group delay variations associated with the received GLONASS signals. The group delay variations may be estimated via the Kalman filtering. The estimated group delay variations may be combined with the received GLONASS signals. In this regard, the estimated group delay variations may be offset to calibrate the received GLONASS signals. The resulting calibrated received GLONASS signals may be utilized by the combined GPS and GLONASS receiver 120 to generate GLONASS related navigation information. In instances where the estimated group delay variations are stable, the combined GPS and GLONASS receiver 120 may also be operable to directly utilize, the received GLONASS signals to generate GLONASS related navigation information.

In some circumstances, the combined GPS and GLONASS receiver 120 may receive the GLONASS signals before the GPS signals are present or become available for use. In this regard, the combined GPS and GLONASS receiver 120 may be operable to determine or estimate group delay variations, namely, calibration coefficients, before the GPS signals become available for use. For example, the combined GPS and GLONASS receiver 120 may be operable to collect or obtain the group delay, errors in the received GLONASS signals. The combined GPS and GLONASS receiver 120 may determine or estimate calibration coefficients based on the obtained group delay errors. In another example, in instances where group delay errors for various GLONASS channels are stored in a look-up table, for example, inside the memory 224, the combined GPS and GLONASS receiver 120 may be operable to obtain or read the stored group delay errors from the look-up table in the memory 224. The combined GPS and GLONASS receiver 120 may determine or estimate calibration coefficients based on the obtained stored group delay errors. Once the GPS signals are received by the combined GPS and GLONASS receiver 120, the estimated calibration coefficients may be updated or refined based on the received GPS signals. For example, the combined GPS and GLONASS receiver 120 may determine or calculate GPS based navigation information from the received GPS signals. The determined GPS based navigation information may be converted into corresponding GLONASS based navigation information to update or refine the estimated calibration coefficients (group delay variations). The combined GPS and GLONASS receiver 120 may be operable to utilize the updated calibration coefficients to form or generate the calibration signal for the calibration of the received GLONASS signals.

In some instances, the combined GPS and GLONASS receiver 120 may be turned on or off. In this regard, before turning off the combined GPS and GLONASS receiver 120, the updated calibration coefficients may be stored into the memory 224. The stored calibration coefficients may be utilized to expedite the calibration of received GLONASS signals upon turning on the combined GPS and GLONASS receiver 120. More specifically, the combined GPS and GLONASS receiver 120 may be operable to generate a calibration signal utilizing the stored calibration coefficients upon turning on. The combined GPS and GLONASS receiver 120 may immediately calibrate received GLONASS signals, upon turning on, utilizing the generated calibration signal. In instances where the GLONASS signals are received without the presence of GPS signals, the combined GPS and GLONASS receiver 120 may collect or obtain the group delay errors in the received GLONASS signals to update or refine the generated calibration signals for the calibration of the received GLONASS signals. Once GPS signals are present and become available for use, the combined GPS and GLONASS receiver 120 may update the calibration signal utilizing the received GPS signals to continue calibrating of the received GLONASS signals.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for calibrating group delay errors in a combined GPS and GLONASS receiver.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for processing signals in a global navigation receiver, comprising:
   receiving a first signal corresponding to a first satellite navigation system;
   receiving a second signal corresponding to a second satellite navigation system;
   generating a calibration signal using the first signal; and
   reducing group delay errors in the second signal using the calibration signal.

2. The method of claim 1, further comprising:
   filtering the calibration signal to generate a filtered calibration signal,
   wherein reducing the group delay errors in the second signal comprises combining the filtered calibration signal with the second signal.

3. The method of claim 2, wherein the filtered calibration signal includes group delay variations associated with the second signal.

4. The method of claim 3, wherein reducing the group delay errors in the second signal further comprises offsetting the group delay errors in the second signal using the group delay variations associated with the second signal.

5. The method of claim 1, wherein the calibration signal includes calibration coefficients for offsetting the group delay errors.

6. The method of claim 1, wherein generating the calibration signal comprises:
   generating first navigation information corresponding to the first satellite navigation system using the first signal;
   converting the first navigation information to second navigation information corresponding to the second satellite navigation system;
   calculating an estimate of the second signal using the second navigation information; and
   comparing the second signal and the estimate of the second signal to generate the calibration signal.

7. The method of claim 1, wherein the first satellite navigation system corresponds to a Global Positioning System (GPS) and the second satellite navigation system corresponds to a Global Orbiting Navigation Satellite System (GLONASS).

8. The method of claim 1, wherein the first satellite navigation system corresponds to a Global Orbiting Navigation Satellite System (GLONASS) and the second satellite navigation system corresponds to a Global Positioning System (GPS).

9. A global navigation receiver, comprising:
   a receiver front end configured to receive a first signal corresponding to a first satellite navigation system and a second signal corresponding to a second satellite navigation system;
   a calibration signal generator configured to generate a calibration signal using the first signal; and
   a signal calibrator configured to reduce group delay errors in the second signal using the calibration signal.

10. The global navigation receiver of claim 9, wherein the signal calibrator comprises:
    a filter configured to filter the calibration signal to generate a filtered calibration signal; and
    a signal coupler configured to combine the filtered calibration signal with the second signal to reduce the group delay errors in the second signal.

11. The global navigation receiver of claim 10, wherein the filtered calibration signal includes group delay variations associated with the second signal.

12. The global navigation receiver of claim 11, wherein the signal coupler is further configured to offset the group delay errors in the second signal using the group delay variations associated with the second signal.

13. The global navigation receiver of claim 9, wherein the calibration signal includes calibration coefficients for offsetting the group delay errors.

14. The global navigation receiver of claim 9, further comprising:

a navigation processor configured to generate first navigation information corresponding to the first satellite navigation system using the first signal, wherein the calibration signal generator comprises:
- a time transfer module configured to convert the first navigation information to second navigation information corresponding to the second satellite navigation system;
- a signal estimator configured to calculate an estimate of the second signal using the second navigation information; and
- a signal comparator configured to compare the second signal and the estimate of the second signal to generate the calibration signal.

15. The global navigation receiver of claim 9, wherein the first satellite navigation system corresponds to a Global Positioning System (GPS) and the second satellite navigation system corresponds to a Global Orbiting Navigation Satellite System (GLONASS).

16. The global navigation receiver of claim 9, wherein the first satellite navigation system corresponds to a Global Orbiting Navigation Satellite System (GLONASS) and the second satellite navigation system corresponds to a Global Positioning System (GPS).

17. The global navigation receiver of claim 9, wherein the global navigation receiver is further configured to reduce group delay errors in the first signal using the calibration signal.

18. The global navigation receiver of claim 9, wherein the global navigation receiver is further configured to retrieve stored group delay variations associated with the first signal from memory.

19. The global navigation receiver of claim 18, wherein the global navigation receiver is further configured to estimate group delay variations associated with the first signal using the first signal.

20. The global navigation receiver of claim 19, wherein the global navigation receiver is further configured to reduce group delay errors in the first signal and offset the group delay errors in the first signal using at least one of the stored group delay variations or the estimated group delay variations.

* * * * *